(12) United States Patent
Koopferstock et al.

(10) Patent No.: US 12,461,805 B1
(45) Date of Patent: Nov. 4, 2025

(54) SYSTEM AND METHOD FOR MONITORING A WEBSITE

(71) Applicant: Noibu Technologies Inc., Ottawa (CA)

(72) Inventors: Joshua Koopferstock, Ottawa (CA); Reid Tait, Ottawa (CA); David Seel, Ottawa (CA); Kiril Kuts, Ottawa (CA); Oleksii Babik, Vancouver (CA); Filip Slatinac, Ottawa (CA); Patrick Soutar, Ottawa (CA); Viktor Musiienko, Toronto (CA)

(73) Assignee: Noibu Technologies Inc.

( * ) Notice: Subject to any disclaimer, the term of this patent is extended or adjusted under 35 U.S.C. 154(b) by 76 days.

(21) Appl. No.: 18/653,411

(22) Filed: May 2, 2024

(51) Int. Cl.
*G06F 11/07* (2006.01)

(52) U.S. Cl.
CPC ........ *G06F 11/076* (2013.01); *G06F 11/0709* (2013.01)

(58) Field of Classification Search
CPC ............. G06F 11/0709; G06F 11/0754; G06F 11/076; G06F 11/2294; G06F 11/3438; G06F 11/3452; G06F 11/3466; H01L 43/55
See application file for complete search history.

(56) References Cited

U.S. PATENT DOCUMENTS

| | | | |
|---|---|---|---|
| 5,974,445 A * | 10/1999 | Pivnichny | H04L 9/40 707/E17.114 |
| 6,601,066 B1 * | 7/2003 | Davis-Hall | G06F 16/958 707/999.005 |
| 6,895,551 B1 * | 5/2005 | Huang | G06F 16/9566 717/124 |
| 8,015,453 B2 * | 9/2011 | Lee | G06F 11/0709 714/38.1 |
| 8,132,095 B2 | 3/2012 | Seolas et al. | |
| 8,683,447 B2 | 3/2014 | Miller | |
| 8,984,491 B2 | 3/2015 | Miller | |
| 9,037,914 B1 * | 5/2015 | Au | G06F 11/0793 714/38.14 |
| 9,811,248 B1 * | 11/2017 | Berg | G06F 3/04842 |
| 2002/0097268 A1 * | 7/2002 | Dunn | G06F 11/2294 715/239 |
| 2002/0173857 A1 * | 11/2002 | Pabari | H04L 67/535 700/1 |
| 2003/0229677 A1 * | 12/2003 | Allan | G06F 16/9566 707/E17.115 |
| 2005/0223082 A1 * | 10/2005 | Sankaran | G06F 11/0709 709/224 |

(Continued)

*Primary Examiner* — Gabriel Chu
(74) *Attorney, Agent, or Firm* — Stratford Group Ltd.

(57) ABSTRACT

Described are various embodiments of system and method for monitoring a website. The system and method allows a website administrator to monitor for specific user event sequences or actions that will trigger a page check to see if one or more web elements or features are correctly displayed or not. In one embodiment, the method comprises the step of monitoring, by a first processor of each of one or more user devices visiting the website, one or more user events. From the one or more user events, the presence of one or more pre-conditions is confirmed, upon the one or more pre-conditions being identified, the method assess the validity of one or more assertions. A failure rate of a number of assertions is checked and compared to a designated threshold. If the designated threshold is exceeded, a notification is sent.

20 Claims, 7 Drawing Sheets

(56) References Cited

U.S. PATENT DOCUMENTS

| | | |
|---|---|---|
| 2007/0234217 A1 | 10/2007 | Miller et al. |
| 2007/0271375 A1* | 11/2007 | Hwang ............... G06F 11/3419 709/224 |
| 2008/0046562 A1 | 2/2008 | Butler |
| 2010/0169792 A1* | 7/2010 | Ascar ................ G06F 11/3438 715/744 |
| 2011/0119220 A1* | 5/2011 | Seolas ................ G06F 40/143 706/47 |
| 2025/0173212 A1* | 5/2025 | Busche ................ G06F 11/079 |

* cited by examiner

SYSTEM AND METHOD FOR MONITORING A WEBSITE

FIELD OF THE DISCLOSURE

The present disclosure relates to website error evaluation, and, in particular, to a system and method for monitoring a website.

BACKGROUND

The problem of isolating and analyzing user sessions and paths on websites is significant across numerous industries, including e-commerce, user experience design, and web development. It impacts website owners, marketers, and developers who seek to understand how users navigate and encounter bugs/errors on their websites that generate losses in sales and revenue. Correctly identifying user experience degradations, assessing website structure effectiveness and design responsiveness within the vast amounts of session data collected is a challenge.

This background information is provided to reveal information believed by the applicant to be of possible relevance. No admission is necessarily intended, nor should be construed that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a system and method that advantageously allows to perform a page check on individual pages.

In accordance with a first aspect, there is provided a computer-implemented method for monitoring a website for errors, comprising the steps of: monitoring, by a first processor of each of one or more user devices visiting the website, one or more user events; identifying from the one or more user events the presence of, by the first processor or a second processor of a server communicatively coupled to the user device via a network, one or more pre-conditions; upon the one or more pre-conditions being identified, assessing, by the first processor or the second processor, the validity of one or more assertions; storing, by the second processor on a second memory of said server, assessment results from the one or more user devices; computing, by the second processor, from the assessment results a check failure rate of said assertions for the one or more user devices; and evaluating, by the second processor, if the check failure rate is larger than a designated threshold.

In some embodiments, the computer-implemented method further comprises the steps of, before said monitoring: storing, on the server, the one or more pre-conditions to be identified, the one or more assertions to be assessed and the designated threshold.

In some embodiments, the computer-implemented method comprises the step of, after said storing but before said identifying: validating, by the first processor or the second processor, the one or more pre-conditions, and the one or more assertions.

In some embodiments, validating comprises the steps of: redirecting, by the first processor, the user device to the website; automatically executing, by the first processor, said one or more pre-conditions; and confirming, by the first processor, that the one or more assertions are present.

In some embodiments, validating comprises the steps of: querying, by the second processor, one or more user sessions of the one or more user devices; filtering, by the second processor, if the one or more pre-conditions were met in said one or more sessions; and deriving, by the second processor, an assertion success rate.

In some embodiments, identifying and assessing is done by the first processor; and further comprising the step of, before said computing: transmitting, from the first processor to the second processor, an assertion result information.

In some embodiments, the computer-implemented method further comprises the step of, before said identifying: transmitting, from the first processor to the second processor, the one or more user events; and wherein said identifying and said assessing is done by the second processor.

In some embodiments, the computer-implemented method further comprises the steps of, after said evaluating: upon said check failure rate being larger than the designated threshold, transmitting, by the second processor, a notification to a designated administrative user.

In some embodiments, each assertion is a test evaluating whether a web element on the web site is present or not in response to the one or more pre-conditions.

In some embodiments, the one or more user events includes one of: a click, a scroll or a keyboard interaction.

In accordance with another aspect, there is provided a system for monitoring a website for errors, comprising: one or more user devices, each user device comprising a first processor; a server comprising a second processor, the server configured to be communicatively coupled with the one or more user devices via a network; wherein each one or more user devices are each configured to monitor one or more user events upon visiting the website; wherein each user device or the server is configured to: identify from the one or more user events the presence of one or more pre-conditions; upon the one or more pre-conditions being identified assessing, the validity of one or more assertions; and wherein the server is further configured to: store assessment results from the one or more user devices; compute from the assessment results a check failure rate of said assertions for the one or more user devices; and evaluate if the check failure rate is larger than a designated threshold.

In accordance with another aspect, there is provided a non-transitory computer-readable medium comprising instructions that, when executed, cause one or more processors to at least: monitor one or more user events on each of one or more user devices visiting a website; identify, for each user device, from the one or more user events the presence of one or more pre-conditions; upon the one or more pre-conditions being identified, assess the validity of one or more assertions; store on a memory assessment results from the one or more user devices; compute a check failure rate of said assertions for the one or more user devices; and evaluate if the check failure rate is larger than a designated threshold.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

Figure 1:
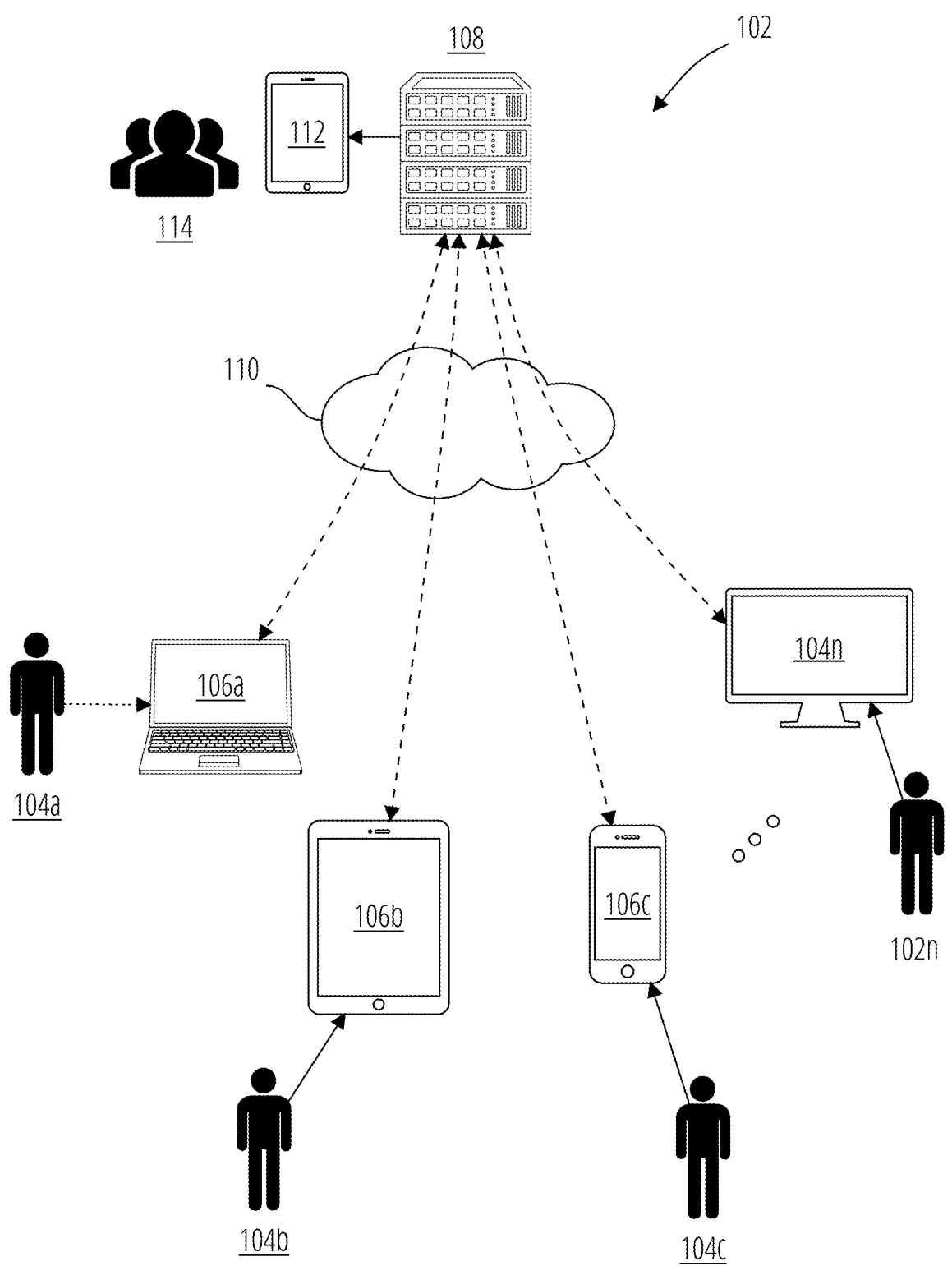
FIG. 1 is a schematic diagram illustrating a system for monitoring a website, in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Unlike synthetic testing, the system and method of the present disclosure, in accordance with different embodiments, allow website administrators to monitor for specific user event sequences or actions that will trigger a page check to see if one or more web elements or features are correctly displayed or not. For example, with the system of the present disclosure, a consumer can go on an e-commerce website where an image of a product should be presented. The system comprises, in accordance with different embodiments, a script or computer-executable code portion that will allow a page check to be performed and verify that the product image is indeed being displayed. In some embodiments, the system and method rely on monitoring and capturing a plurality of user events (e.g., clicks, keyboard events, scrolls, etc.) on a user device to identify one or more pre-conditions (e.g., designated user events, alone or in sequence) that will trigger the page check to be performed. The page check will be configured to perform an assessment of one or more so-called assertions, each assertion being a test for the presence or absence of one or more web elements (e.g., text, images, videos, links, web formatting, etc.). In other words, the page check allows to monitor that the web site performs as intended, and allows to quickly identify abnormal responses. The system and method therefore uses the error information in an advanced and efficient way to understand and optimize user interactions on websites. While the following disclosure is mainly directed to e-commerce applications, the skilled person in the art will appreciate that other types of applications may also benefit from the disclosure.

Note that the term 'error' (or 'abnormality', 'failure', etc.) as used herein should be interpreted broadly. 'Errors' include, but are not limited to, 'bugs', 'glitches', flaws in code, problems resulting from unexpected user input, logic errors, display errors, interface errors, status and/or network communication errors, and/or anything else that results in less-than-optimal performance of the computer system. Additionally, the term 'error' may include errors that prevent users from accessing the computer system at all. Similarly, the term 'computer system' should be interpreted broadly, as including without limitation websites, games, computer programs, downloaded software, on-line or cloud-based software, distributed systems, and hardware on which the software may be run. In some embodiments, the system of the present disclosure may not distinguish between hardware and software errors, while in other embodiments, such distinctions may be made.

FIG. 1 shows a schematic diagram illustrating an exemplary page check monitoring system 102, in accordance with one embodiment. In this example, the system 102 is implemented as a cloud-based software-as-a-service (SaaS) platform or the like. A plurality of users 104a . . . 104n may each use or interact with a corresponding user device 106a, . . . 106n to access in a dedicated user session of an online e-commerce application or platform hosted by the server 108 (or other servers coupled to server 108) via the network 110.

In some embodiments, the user-devices 106a-106n may take the form of any computing or digital processing device, including for example, but not limited to, a desktop computer, a laptop computer, a tablet, a smartphone, a smartwatch or the like. Although a single server 108 is illustrated in FIG. 1, the skilled person in the art will appreciate that the server 108 may comprise a plurality of communicatively coupled servers or the like. In some other embodiments, the system 102 may comprise partial or full offline functionality, and thus not require, or require in a limited fashion, the server 108. More generally, the functionality discussed herein may also be implemented on one or more computing devices or systems. The system 102 further configures the server 108 to provide outputs to a device 112 accessible by one or more administrative users 114 regarding application errors experienced by the users 104a . . . 104n. The system 102 further allows the administrative users 114 to create and configure page checks for use on their website, and review or receive notifications indicative of a high number of page check failures. Administrative users 114 are therefore notified immediately when problems, errors or anomalies are detected.

Figure 2:
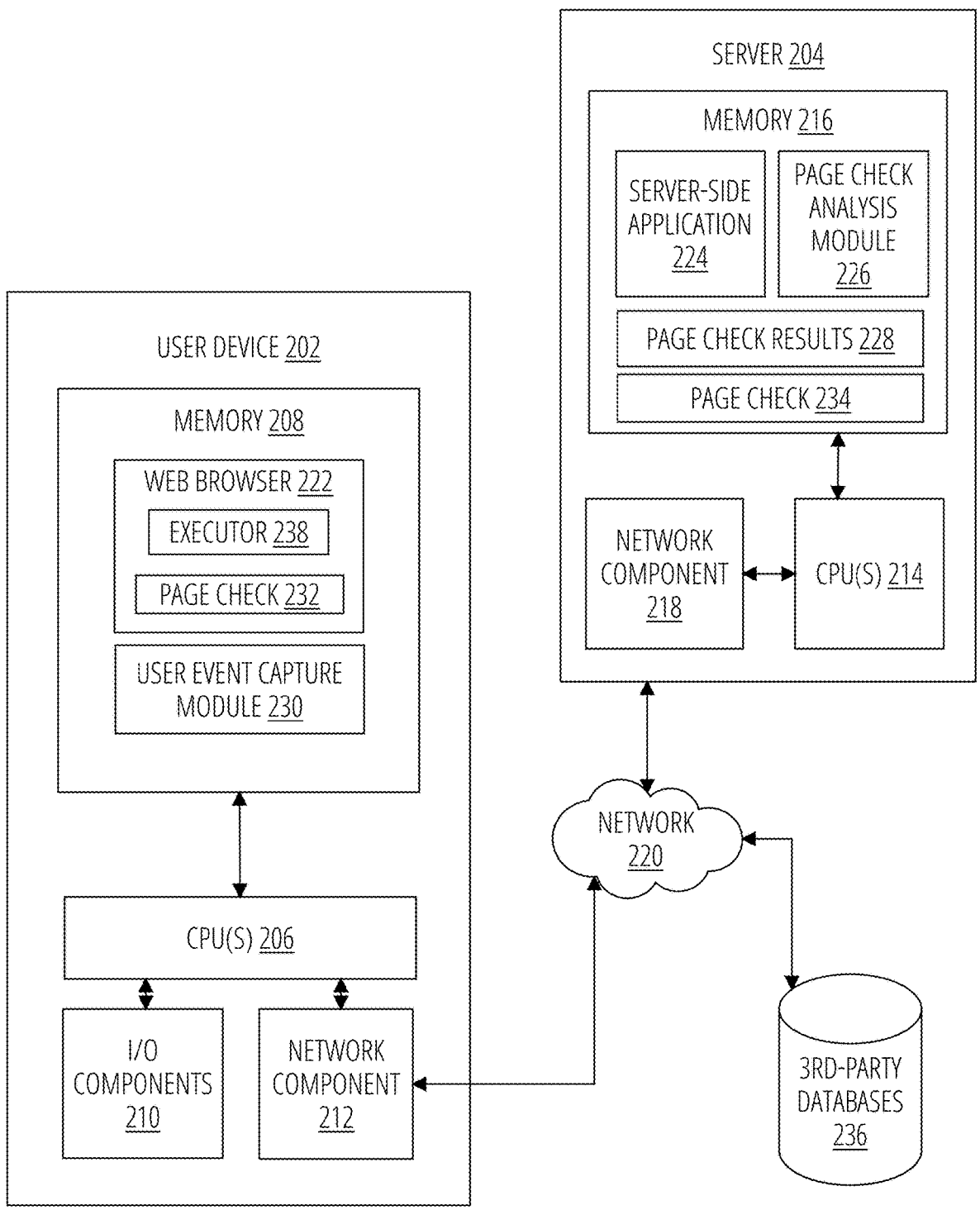
FIG. 2 is a box diagram illustrating a user device and a server of the system of FIG. 1, in accordance with one embodiment.

FIG. 2 is a block diagram illustrating an exemplary user device 202 and server 204, both of which are computing or digital processing devices (corresponding for example to any user device 104 and server 108 of FIG. 1, respectively). The user device 202 thus comprises one or more digital processors (e.g., CPU(s) 206), a memory 208, I/O components 210, and a network component 212. The server 204 similarly comprises one or more processors (e.g., CPU(s) 214), a memory 216 and a network component 218. In this example, the server 204 may be configured to provide the e-commerce functionality in parallel with the error monitoring and analysis functionality. However other implementations may have the server 204 be a dedicated error monitoring server coupled to one or more servers providing the e-commerce functionality.

In some embodiments, the memories 208 and 216 may comprise any known form of computer memory or storage. This may include, for example, but without limitation, storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory, solid state memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any method, application or module herein described may be implemented using computer readable/executable instructions that may be stored or otherwise held by such computer readable media and executed by the one or more processors.

In some embodiments, the CPU(s) 206 and 214 may include any known type of digital processor or the like. This can include general purpose processors (e.g., x86 or the like), embedded processors, or programmable processors (e.g., field programmable gate array processors or FPGA). Further, unless the context clearly indicates otherwise, any processor set out herein may be implemented as a singular processor or as a plurality of processors. The plurality of processors may be arrayed or distributed, and any processing function referred to herein may be carried out by one or by a plurality of processors, even though a single processor may be exemplified.

The network component 212 and 218 each may be configured to enable the computing device to communicate and/or exchange data with other components, to access and connect to network resources, to serve applications, and/or perform other computing applications by connecting to a network 220. The network 220 can be a single network or multiple connected networks capable of carrying data, including the Internet, an Ethernet network, integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples, or any combination thereof.

The input/output components (e.g., I/O components 210) of the user device 202 allow communication with a human user via an associated input, output, or input/output device such as a keyboard, a mouse, a touchscreen, and display. The display may be used to generate a graphical user interface (GUI) or the like. In the case where the user device 202 is used by an administrator, the GUI is used to provide information about the application errors encountered and their analysis.

As mentioned above, in some embodiments, the system may be configured using a client-server model or the like. The user device 202 may comprise a web browser 222 in memory 208 which, upon being executed by the CPU(s) 206 allow the user device 202 to communicate with the server 204 via the network component 212. The server 204 may comprise in the memory 216 a server-side application 224 that allows the CPU(s) 214 to respond to or communicate with the user device 202 via the network component 218. In addition, the page check analysis module 226 may use the captured page check results 228 retrieved, in some embodiments, from the user device 202 to determine whether a page check failure rate is higher than a designated threshold.

The specification is amended at page 8, paragraph 45, In some embodiments, user session information may be captured from recorded user's sessions (e.g., screen recordings), for example via a data collector or user event capture module 230 stored in memory 208 of the user device 202. In some embodiments, the page check application or script may be executed locally on the user device (e.g., page check 232), or in other embodiments may be executed on the server 204 (e.g., page check 234), as will be discussed below.

Both the page check and data collector module may each be a separate application or script accessed or downloaded via a web page. In some embodiments, different modules/instructions may be combined or distributed on different devices, in accordance with different implementations. In some embodiments, user-event information and associated application information may be captured from recorded user sessions. For example, in some embodiments, the user-event information may be captured on the client side. For example, the session information may be collected from users accessing the e-commerce application. The page check 232 and/or data collector module or user event capture module 230 may be provided as a script that is downloaded and run as part of the ecommerce application and/or embedded in a webpage of the e-commerce application. The page check and/or data collector script may be an initial script downloaded and run in order to capture any potential errors resulting when loading the e-commerce application. The browser information may provide information about the browser version, plug-ins, etc. as well as information about the operating system of the user's device.

In some embodiments, the server 204 and/or user device 202 may further be configured to communicate with one or more 3rd-party databases 236 via network 220. This may include, for example, one or more 3rd-party servers or databases relating to different services, for example email servers, scheduling systems, or the like.

Figure 3:
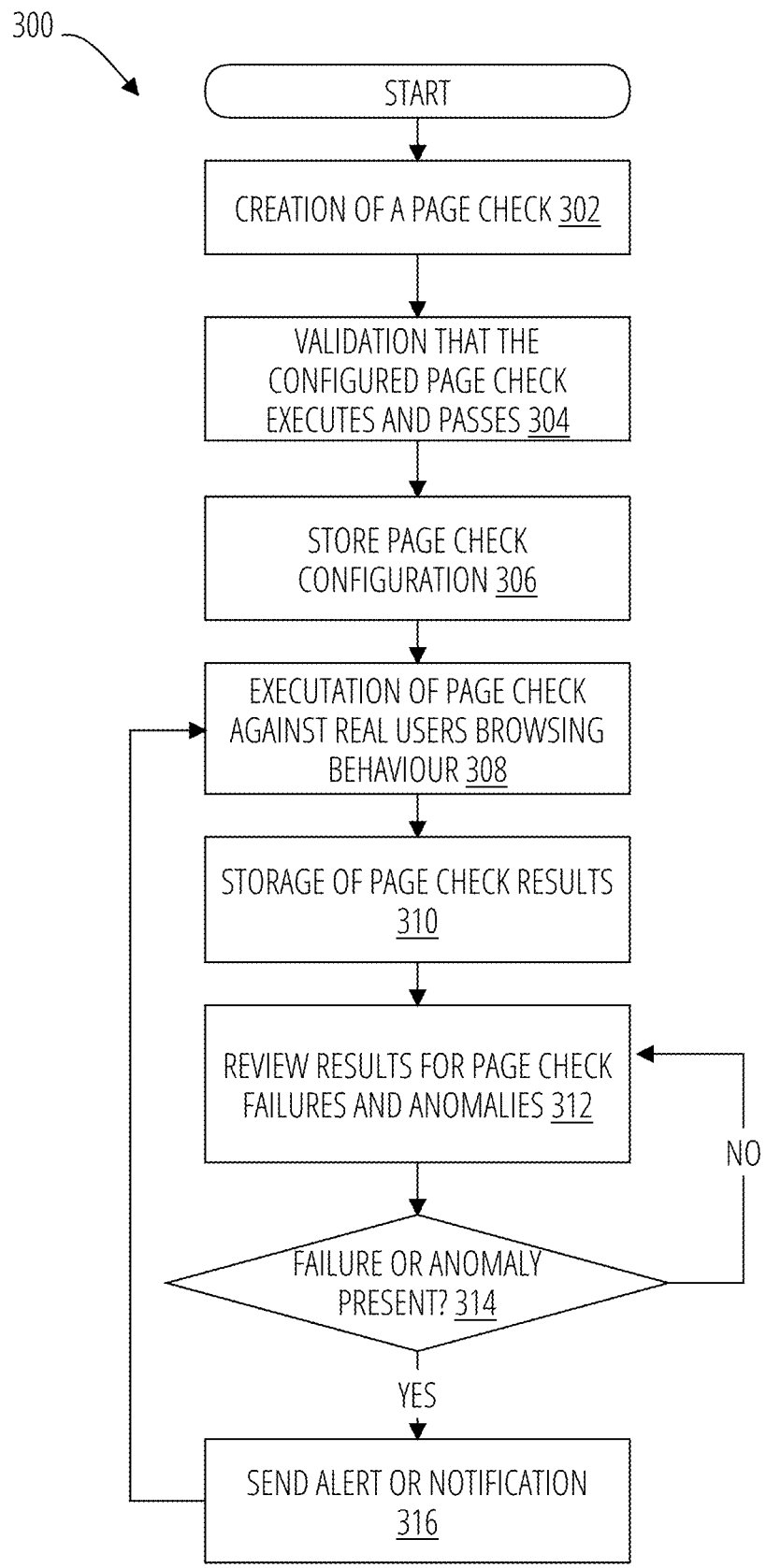
FIG. 3 is a flow process diagram of a high-level page check lifecycle, in accordance with one embodiment.

FIG. 3 illustrates an exemplary overall page check lifecycle of the present disclosure, in accordance with one embodiment. It will be appreciated that this example discloses steps that may be implemented in different ways, for example either on a user device and/or on a backend remote server.

In this high-level example, the page check lifecycle process 300 starts at step 302 where the page check is created and configured by, for example, an administrative user. This may be done for example via a graphical user interface (GUI) on a device 112. The platform of the present disclosure allows such users to create one or more page checks to monitor one or more web pages, in various ways.

Figure 6:
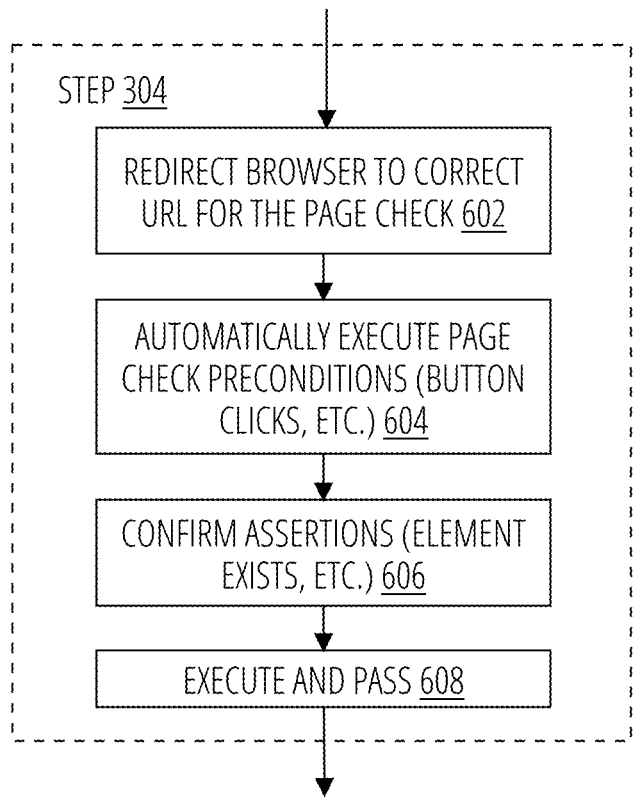
FIG. 6 is a process flow diagram illustrating a page check validation process, in accordance with one embodiment.
Figure 7:
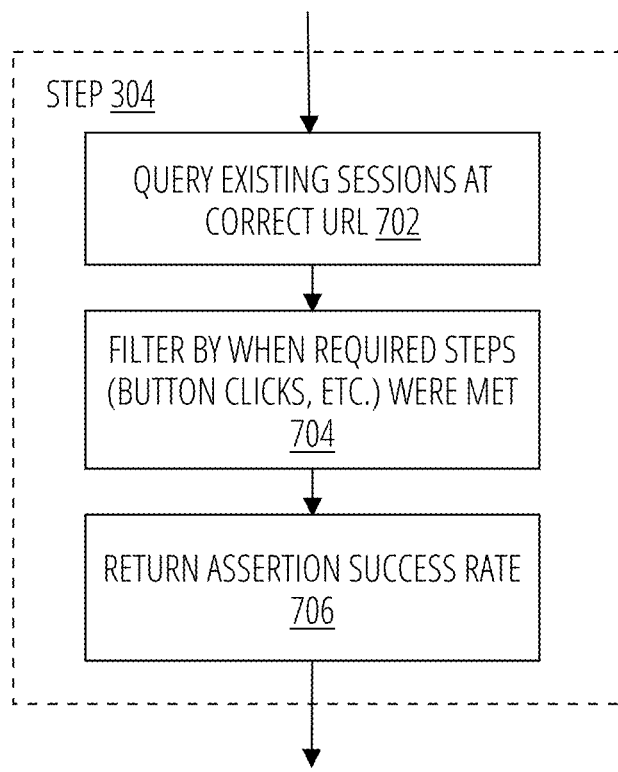
FIG. 7 is a flow process diagram illustrating a page check validation process, in accordance with another embodiment.

At step 304, once the page check has been created and configured, the system validates the created page check is correctly configured and runs a validation process. Non-limiting examples of the validation sub-process are illustrated in FIG. 6 and FIG. 7.

Figure 5:
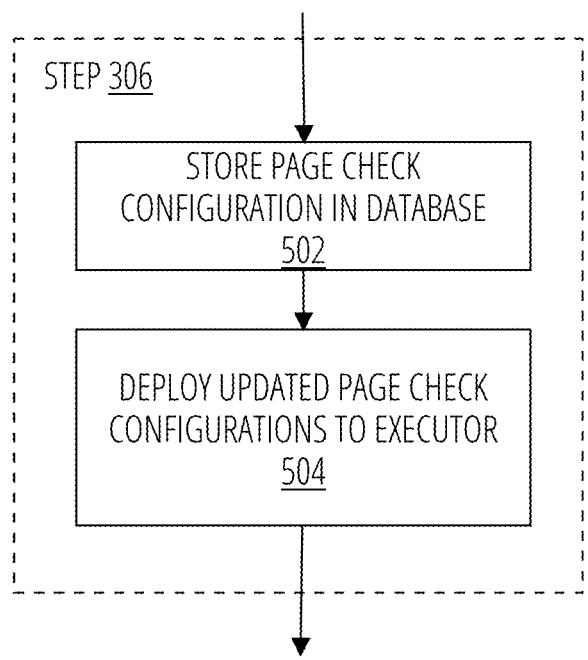
FIG. 5 is a flow process diagram illustrating a page check storage process, in accordance with one embodiment.

At step 306, the page check configuration is stored in memory before deployment. A non-limiting exemplary sub-process for storing and deploying the page check is illustrated in FIG. 5.

Figure 9:
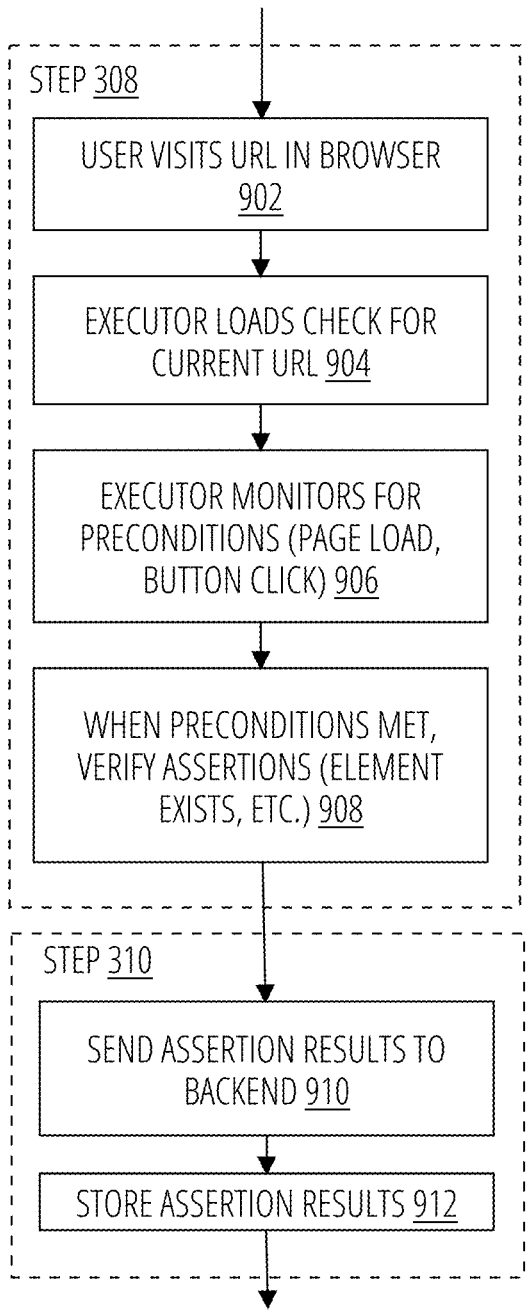
FIG. 9 is a flow process diagram illustrating a page check process, in accordance with one embodiment.
Figure 10:
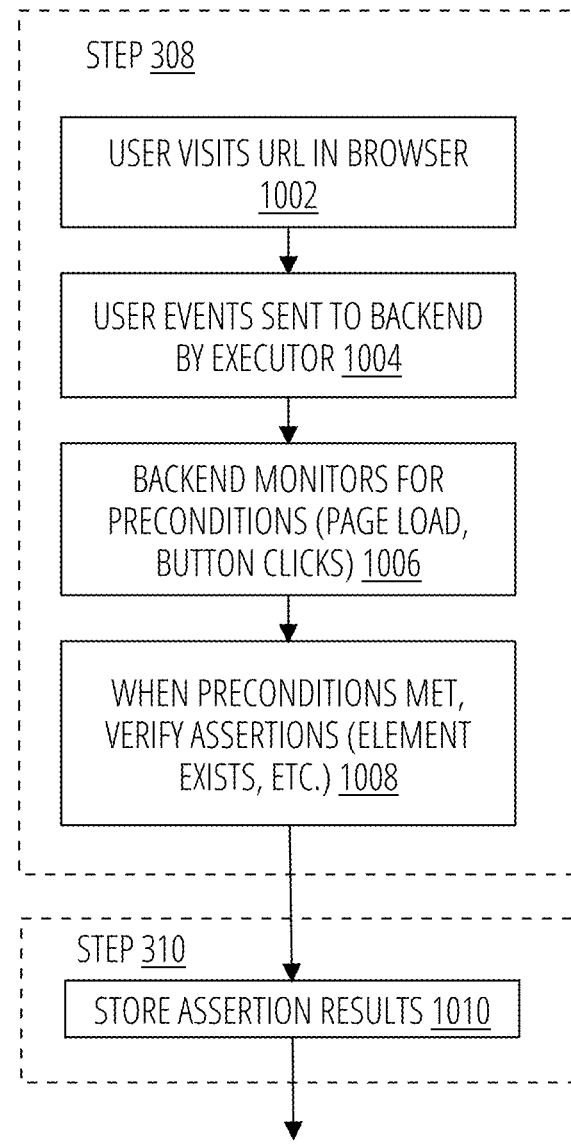
FIG. 10 is a flow process diagram illustrating a page check process, in accordance with another embodiment.

At step 308, the page check is executed against real user browsing behavior at the designated URL. Examples of implementations are illustrated in FIG. 9 and FIG. 10.

At step 310, the page check or assertion results generated by the page check are stored in memory, for example of the server 204. The data may include results from a plurality of page check instances monitoring a same URL from a plurality of different user sessions.

At step 312, the page check analysis module 226 reviews or scans the stored results to identify any failure or anomaly. If, at step 314, the system identifies one or more anomalies/errors in the stored results, then at step 316 an alert or notification is generated and sent to one or more administrative users for review. As the page check instance runs continuously on the webpage, the process 300 goes back to steps 308. It will further be understood that, in some embodiments, steps 312-316 may be run in parallel to step 308-310. This allows the process to run in a continuous or quasi-continuous fashion without interruption.

Figure 4:
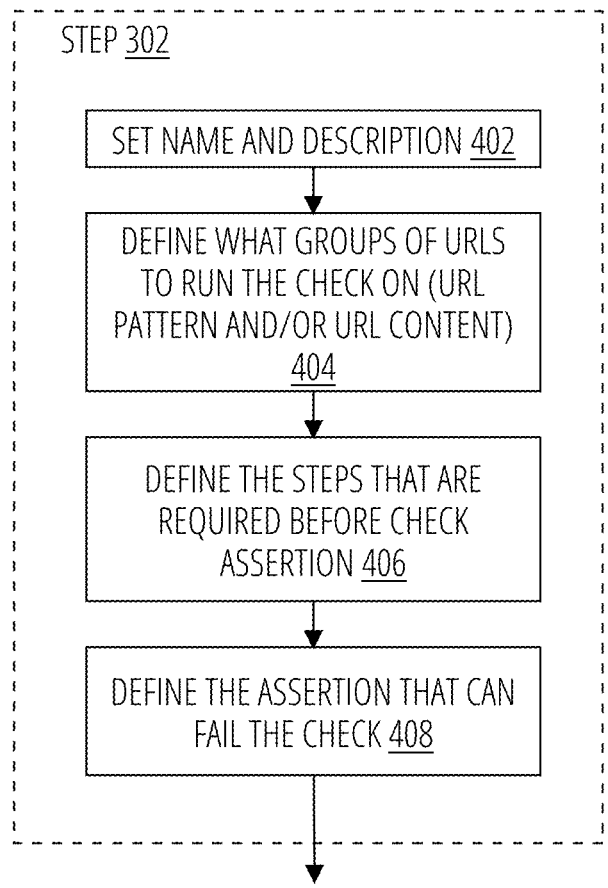
FIG. 4 is a flow process diagram illustrating a page check creation process, in accordance with one embodiment.

FIG. 4 illustrates an exemplary implementation of the page check creation step 302 of FIG. 3. In this example, step 302 is implemented using sub-steps 402-408. At sub-step 402, the web page administrator provides a name and description for the new page check. At sub-step 404, the website administrator may enter or define one or more groups of URLS(s) to associate with the page check. For example, this may include a URL pattern and/or URL content that the page check will monitor or check on. At sub-step 406, the website administrator may enter or define one or more steps required before check page checks for one or more assertions that will trigger a failed check. At sub-step 408, the one or more assertions are defined.

With reference to FIG. 5, an exemplary implementation of step 306 of FIG. 3 is presented. In this non-limiting example, step 306 is implemented via sub-steps 502 and 504. At sub-step 502, the page check configuration from step 304 is stored in memory 216 of server 204 (and/or in a 3rd-party databases 236). At sub-step 504, the page check is deployed to the executor 238 on user device 202.

FIG. 6 and FIG. 7 illustrates two exemplary implementations of the page check validation step 304 of FIG. 3. FIG. 6 implements a real-time validation via sub-steps 602-608, while FIG. 7 implements a historical validation via sub-steps 702-706.

With reference to FIG. 6, at sub-step 602, the web browser 222 is automatically redirected to the correct URL associated with the page check. At sub-step 604, the one or more preconditions necessary to trigger the page check (e.g., button clicks, etc.) are automatically executed. At sub-step 606, the assertions (element exists, etc.) are identified and confirmed.

With reference to FIG. 7, an alternative sub-process is described. In this embodiment, at sub-step 702, the system queries one or more existing web sessions for the designated URL. At sub-step 704, the session information or data is retrieved and filtered to identify if and when the required steps or preconditions were met for each session. At sub-step 706, the server-side application 224 computes an assertion success rate, either for each session, or for all sessions.

Figure 8:
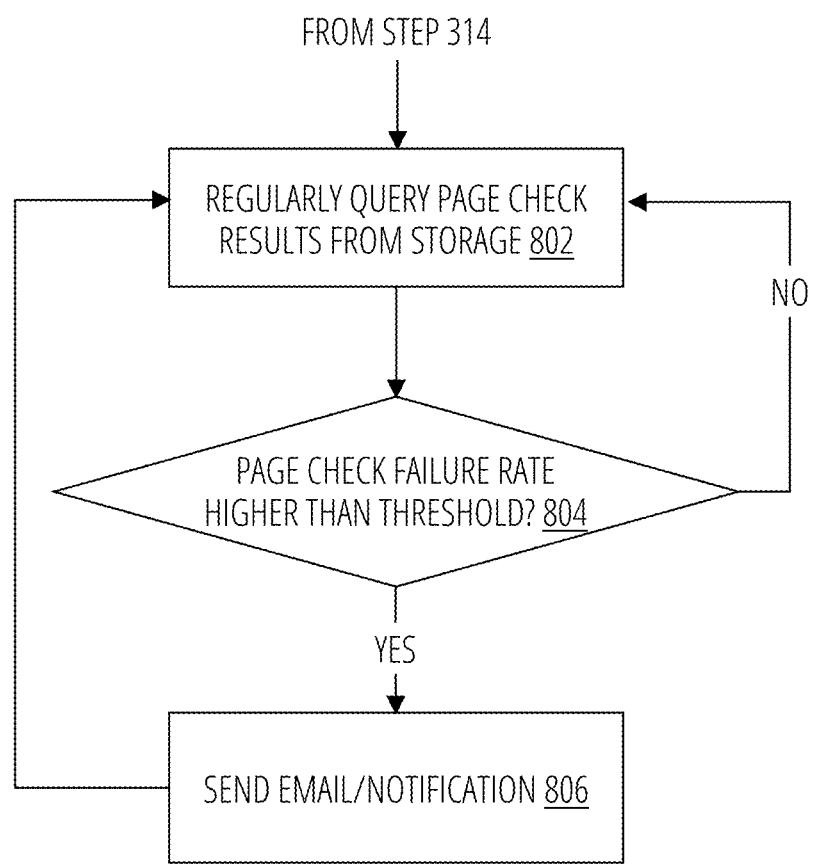
FIG. 8 is a flow process diagram of an alert or notification process, in accordance with one embodiment.

With reference to FIG. 8, reviewing page check or assertion results (e.g., Step 312 of FIG. 3) may be performed in different ways, as will be readily understood by the skilled person in the art. For example, FIG. 8 illustrates exemplary steps 802, 804 and 806 which may replace steps 312, 314 or 316 of FIG. 3, respectively. In this embodiment, reviewing page check results for failure and anomalies include comparing a check page failure rate to a designated failure threshold. The failure threshold can be configured when the administrative user creates the page check (at step 302 of FIG. 3 for example). At step 802, the backend queries the page check results (or assertions) from storage at regular intervals. This may include computing a failure rate from the stored results (resulting from multiple users visiting the web page associated with the page check). The page check failure rate is then compared to the designated failure threshold at step 804. If the failure rate is higher than the designated failure threshold, the alert/notification is sent at step 806. Alert or notifications may include any known methods used to communicate with users via personal user devices, including without limitation, text messages, emails, notifications. It may also include displaying an alert on a dedicated website accessible by the administrative user.

With reference to FIG. 9 and FIG. 10, two exemplary embodiments of the page check deployment and execution steps 308 and 310 of FIG. 3 will be described. FIG. 9 illustrates an example of a real-time page check sub-process performed mostly on the user device 202, while FIG. 10 illustrates an exemplary backend check sub-process performed on the server-side application 224.

FIG. 9 illustrates an exemplary real-time page check sub-process comprising sub-steps 902-908 implementing step 308 of FIG. 3, and sub-steps 910 and 912 implementing step 310. In this example, at sub-step 902, a user enters the URL to a website or webpage via, for example, a web browser application of their network-connected user device 202. Upon accessing the website or webpage, at sub-step 904 the browser application loads a page check instance associated with the current URL in memory 208 (from server 204), in the form of computer-readable instructions, for example a JavaScript script or the like. At sub-step 906, the executor 238 executes the page check instructions and monitors captured user events for the designated pre-conditions. If and when the one or more pre-conditions are met, the executor verifies the one or more assertions (e.g., if a web element on the web page is present or missing, etc.). Once done, the assertion results (or page check results 228) are sent at sub-step 910 to the server 204 for storage in memory 216.

FIG. 10 illustrates another implementation where step 310 comprises sub-steps 1002-1008, and step 310 comprises sub-step 1010. In this example, after the user visits the URL at sub-step 1002, the user device 202 captures a list of user events via the user event capture module 230 and sends it to the server 204 at sub-step 1004. At sub-step 1006, the page check analysis module 226 on the remote server is used to review, in real-time or at intervals, the received user events for any pre-condition associated with the page check for that URL. At sub-step 1008, when the pre-conditions are met, the assertions are checked (e.g., if a web element on the web page is present or missing, etc.) by the page check analysis module 226, and the assertion results (or page check results 228) are stored in memory 216.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A computer-implemented method for monitoring a website for errors, comprising the steps of: monitoring, by a first processor of each of one or more user devices visiting the website, one or more user events; identifying from the one or more user events the presence of, by the first processor or a second processor of a server communicatively coupled to the one or more user devices via a network, one or more pre-conditions; upon the one or more pre-conditions being identified, assessing, by the first processor or the second processor, the validity of one or more assertions; storing, by the second processor on a second memory of said server, assessment results from the one or more user devices; computing, by the second processor, from the assessment results a check failure rate of said assertions for the one or more user devices; and evaluating, by the second processor, if the check failure rate is larger than a designated threshold.

2. The computer-implemented method of claim 1, further comprising the steps of, before said monitoring:
storing, on the server, the one or more pre-conditions to be identified, the one or more assertions to be assessed and the designated threshold.

3. The computer-implemented method of claim 2, further comprising the step of, after said storing the one or more assertions but before said identifying: validating, by the first processor or the second processor, the one or more pre-conditions, and the one or more assertions.

4. The computer-implemented method of claim 3, wherein said validating comprises the steps of: redirecting, by the first processor, the one or more user devices to the website; automatically executing, by the first processor, said one or more pre-conditions; and confirming, by the first processor, that the one or more assertions are present.

5. The computer-implemented method of claim 3, wherein said validating comprises the steps of: querying, by the second processor, one or more user sessions of the one or more user devices; filtering, by the second processor, if the one or more pre-conditions were met in said one or more user sessions; and deriving, by the second processor, an assertion success rate.

6. The computer-implemented method of claim 1, wherein:
said identifying and said assessing is done by the first processor; and
further comprising the step of, before said computing:
transmitting, from the first processor to the second processor, an assertion result information.

7. The computer-implemented method of claim 1, further comprising the step of, before said identifying:
transmitting, from the first processor to the second processor, the one or more user events; and
wherein said identifying and said assessing is done by the second processor.

8. The computer-implemented method of claim 1, further comprising the steps of, after said evaluating:
upon said check failure rate being larger than the designated threshold, transmitting, by the second processor, a notification to a designated administrative user.

9. The computer-implemented method of claim 1, wherein each assertion is a test evaluating whether a web element on the website is present or not in response to the one or more pre-conditions.

10. The computer-implemented method of claim 9, wherein said one or more user events includes one of: a click, a scroll or a keyboard interaction.

11. A system for monitoring a website for errors, comprising:
one or more user devices, each user device comprising a first processor;
a server comprising a second processor, the server configured to be communicatively coupled with the one or more user devices via a network;
wherein each one or more user devices are each configured to monitor one or more user events upon visiting the website;
wherein each user device or the server is configured to:
identify from the one or more user events the presence of one or more pre-conditions;
upon the one or more pre-conditions being identified assessing, the validity of one or more assertions; and
wherein the server is further configured to:
store assessment results from the one or more user devices;
compute from the assessment results a check failure rate of said assertions for the one or more user devices; and
evaluate if the check failure rate is larger than a designated threshold.

12. A non-transitory computer-readable medium comprising instructions that, when executed, cause one or more processors to at least:
monitor one or more user events on each of one or more user devices visiting a website;
identify, for each user device, from the one or more user events the presence of one or more pre-conditions;
upon the one or more pre-conditions being identified, assess the validity of one or more assertions;
store on a memory assessment results from the one or more user devices;
compute a check failure rate of said assertions for the one or more user devices; and evaluate if the check failure rate is larger than a designated threshold.

13. The non-transitory computer-readable medium of claim 12, wherein the instructions further cause the one or more processors to, before said monitoring:
store the one or more pre-conditions to be identified, the one or more assertions to be assessed and the designated threshold on a memory.

14. The non-transitory computer-readable medium of claim 13, wherein the instructions further cause the one or more processors to, after said storing the one or more assertions but before said identifying: validate, by a first processor or a second processor of said one or more processors, the one or more pre-conditions, and the one or more assertions.

15. The non-transitory computer-readable medium of claim 14, wherein said validating comprises the steps of:
redirecting, by the first processor, the user device to the website;
automatically executing, by the first processor, said one or more pre-conditions; and
confirming, by the first processor, that the one or more assertions are present.

16. The non-transitory computer-readable medium of claim 14, wherein said validating comprises the steps of: querying, by the second processor, one or more user sessions of the one or more user devices; filtering, by the second processor, if the one or more pre-conditions were met in said one or more user sessions; and deriving, by the second processor, an assertion success rate.

17. The non-transitory computer-readable medium of claim 12, wherein:
said identifying and said assessing is done by a first processor of said one or more processors;
and further comprising the step of, before said computing:
transmitting, from the first processor to a second processor of said one or more processors, an assertion result information.

18. The non-transitory computer-readable medium of claim 12, wherein the instructions further cause the one or more processors to, before said identifying: transmit, from a first processor to a second processor of said one or more processors, the one or more user events; and wherein said identifying and said assessing is done by the second processor.

19. The non-transitory computer-readable medium of claim 12, wherein the instructions further cause the one or more processors to, after said evaluating:
upon said check failure rate being larger than the designated threshold, transmit a notification to a designated administrative user.

20. The non-transitory computer-readable medium of claim 12, wherein each assertion is a test evaluating whether a web element on the website is present or not in response to the one or more pre-conditions.

* * * * *